United States Patent [19]

Niemann

[11] Patent Number: 4,475,725
[45] Date of Patent: Oct. 9, 1984

[54] ELASTIC SUPPORT FOR HELICAL SPRINGS

[75] Inventor: Gerhard Niemann, Bramsche, Fed. Rep. of Germany

[73] Assignee: Volkswagenwerk AG, Wolfsburg, Fed. Rep. of Germany

[21] Appl. No.: 448,507

[22] Filed: Dec. 9, 1982

Related U.S. Application Data

[63] Continuation of Ser. No. 198,265, Oct. 17, 1980, abandoned.

[30] Foreign Application Priority Data

Oct. 18, 1979 [DE] Fed. Rep. of Germany ....... 2942135

[51] Int. Cl.³ .............................................. F16F 1/12
[52] U.S. Cl. ....................................... 267/179; 267/60
[58] Field of Search ................. 267/60, 170, 174, 177, 267/178, 179, 182, 61

[56] References Cited

U.S. PATENT DOCUMENTS

| | | | |
|---|---|---|---|
| 1,595,317 | 8/1926 | Scholey | 267/174 |
| 1,948,600 | 2/1934 | Templeton | 267/177 |
| 2,412,250 | 12/1946 | Buckius | 267/170 |
| 2,466,094 | 4/1949 | Frost, Jr. | 267/60 |
| 2,514,394 | 7/1950 | Irving | 267/170 |
| 2,887,310 | 5/1959 | Müller | 267/60 |
| 3,057,640 | 10/1962 | Soer | 267/60 |
| 3,141,660 | 7/1964 | Clarke et al. | 267/60 |
| 4,162,064 | 7/1979 | Bouton et al. | 267/179 |

FOREIGN PATENT DOCUMENTS

| | | |
|---|---|---|
| 2633739 | 6/1977 | Fed. Rep. of Germany . |
| 2805223 | 8/1978 | Fed. Rep. of Germany . |
| 1353014 | 1/1964 | France .................... 267/179 |
| 1391845 | 2/1965 | France .................... 267/179 |
| 2333162 | 6/1977 | France . |
| 236279 | 6/1945 | Switzerland . |

*Primary Examiner*—Douglas C. Butler
*Assistant Examiner*—R. R. Diefendorf
*Attorney, Agent, or Firm*—Spencer & Frank

[57] ABSTRACT

A suspension spring assembly for a motor vehicle includes a helical spring having an end coil and a support of elastic material having a helically ascending seating face receiving the end coil. The slope of the ascending seating face at least equals that of the end coil in the unloaded state of the helical spring and further, the seating face is adjoined by a stepped portion for abruptly terminating the seating face.

1 Claim, 5 Drawing Figures

ELASTIC SUPPORT FOR HELICAL SPRINGS

This application is a continuation of application Ser. No. 198,265, filed Oct. 17, 1980, now abandoned.

BACKGROUND OF THE INVENTION

This invention relates to a suspension spring assembly for motor vehicles and is particularly concerned with a support of elastic material for the end coil of a helical spring of the suspension. The seating face of the support has a helically ascending course.

Helical springs are mass-manufactured as suspension springs for supporting the body of a motor vehicle. These springs are made of wire which is usually wound about the spring axis with a constant coil diameter and with a uniform slope (helix angle) over the entire springing zone. All springing coils of a linear, cylindrical helical compression spring contribute the same amount to the entire spring path because, due to their identical helix angles—and thus identical pitch—they remain fully effective until they all block simultaneously, that is, the coils do not contact one another earlier. In addition to the effective (springing) coils, the springs also include non-springing (dead) end coils which are to transfer external loads from the associated spring seat discs to the springing coils in as centered a manner as possible (that is, the axis and the line of action of the spring preferably coincide). Generally about ¾ of one coil is provided for this purpose at each end of a spring, so that the contact areas each extend over a winding angle of about 270°. In most cases the end coils have, even in the unloaded installed state, an approximate pitch which corresponds to the wire diameter, while the effective (springing) coils have a greater pitch (slope).

Usually, the spring end of prior art arrangements rolls off on the spring support as the point of disconnection, that is, the location where the spring end lifts off from the support, changes to a greater or lesser degree dependent upon the spring force (vehicle load). Thus, one part of the spring end rests on the support only at times. As a result, on the one hand, the customary anticorrosion coating of the spring will be destroyed at this spring part because of the occasional rolling action and, on the other hand, water can splash and dirt can penetrate between the support and the spring, thus causing an increased corrosion.

SUMMARY OF THE INVENTION

It is an object of the invention to provide an improved spring support of the above-outlined type which substantially prevents corrosion at the spring ends.

This object and others to become apparent as the specification progresses, are achieved by the invention, according to which, briefly stated, the slope of the seating face of the elastic support at least equals that of the end coil of the unstressed (unloaded) spring and further the seating face abruptly terminates with a step.

The features according to the invention ensure that the point of disconnection between spring end and elastic support is at the same location for all loads. The range of contact between spring and support is thus completely independent of the spring force (or the vehicle load). The spring end thus no longer rolls off the elastic support so that damage to the anticorrosion coating is prevented and thus the formation of corrosion is reduced. The danger of spring breaks due to heavy corrosion is thus practically eliminated.

DESCRIPTION OF THE PREFERRED EMBODIMENT

Figure 1:
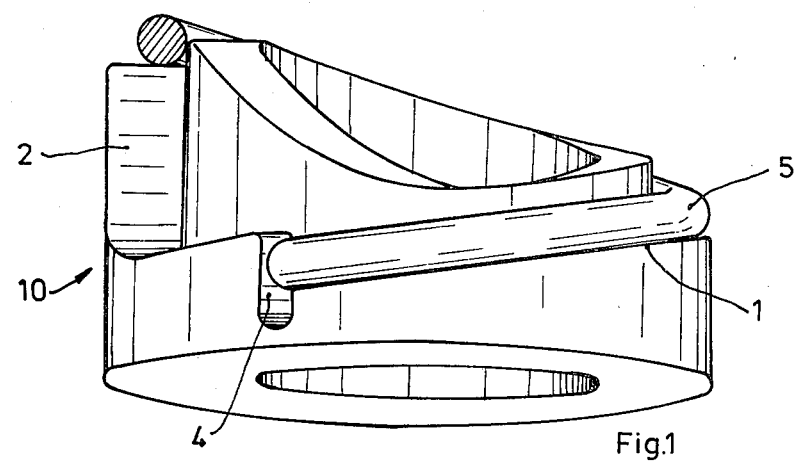
FIG. 1 is a perspective view of a preferred embodiment of the invention.

Turning now to FIG. 1, there is shown a support generally designated at 10 for supporting the spring end 5 of a helical vehicle spring on a conventional lower spring seat disc (not shown). The support 10 which is of resilient material, such as rubber, includes a helically ascending seating face 1 whose slope is dimensioned so that it at least equals the slope of the end winding (end coil) 5 of the unloaded helical spring freely supported thereon. The seating face 1 ends abruptly with a steeply descending step 2 (particularly well seen in FIG. 3) from which point on the active coils of the helical spring become effective. The end face (spring end) of the helical spring abuts a shoulder 4 of the support 10, whereby a defined length of the effective spring seating is simultaneously assured.

Due to an appropriate choice of dimensions, the spring end 5 is seated fully on the support 10 even when the helical spring is unstressed. As a result, on the one hand, no damage will occur to the anticorrosion coating in the area of the seated end coil 5 and, on the other hand, the successive spring coil can be deflected freely and without damaging contacting.

Figure 2:
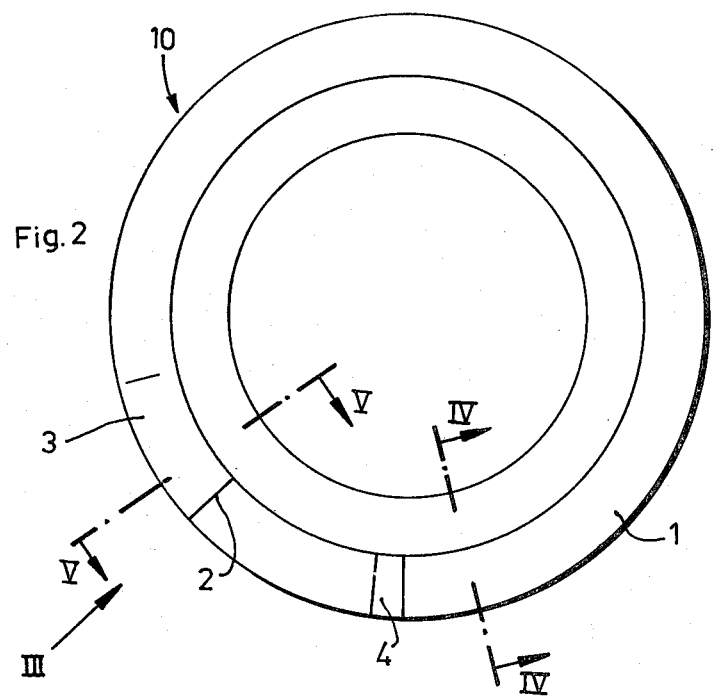
FIG. 2 is a top plan view of the preferred embodiment.
Figure 3:
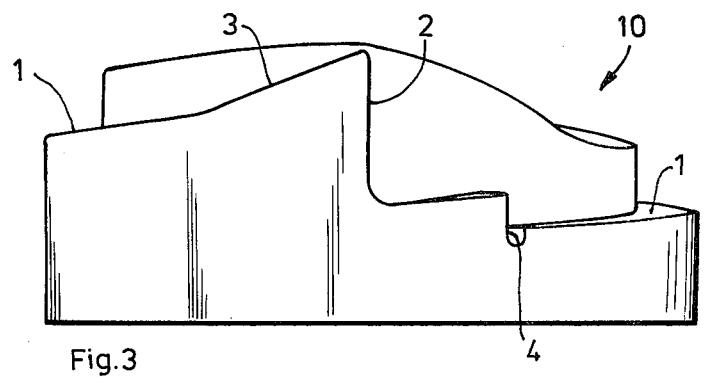
FIG. 3 is a side elevational view of the preferred embodiment as seen in the direction of arrow III of FIG. 2.
Figure 4:
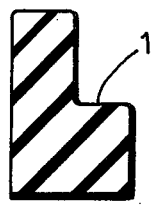
FIGS. 4 and 5 are sectional views taken along respective lines IV—IV and V—V of FIG. 2.
Figure 5:

Particularly referring to FIGS. 2 and 3, the seating face 1 of the support 10 extends along a major portion of the circumference of the support 10 and is adjoined by an end portion 3 which terminates at the step 2 and which has a slope greater than that of the seating face 1. Thus, while—as noted above—the seating face 1 has a slope which at least equals the slope of the end coil 5, the end region 3 is dimensioned somewhat larger than the slope of the end coil 5 of the unloaded helical spring. This arrangement constitutes an additional safety measure preventing the spring end from lifting off the elastic support in the particularly endangered region immediately before the intended point of disconnection between the spring and the seating face.

It will be understood that the above description of the present invention is susceptible to various modifications, changes and adaptations and the same are intended to be comprehended within the meaning and range of equivalents of the appended claims.

What is claimed is:

1. A suspension spring assembly for a motor vehicle, comprising a helical spring having an end coil terminating in a spring end and a support of rubber-like elastic material having a helically ascending seating face receiving the end coil; said seating face being adjoined by a stepped portion for abruptly terminating said seating face; said helically ascending seating face having consecutive first and second length portions; said first length portion extending from said spring end along a major part of said end coil and having a first slope at least equalling the slope of said end coil in the unloaded state of the helical spring; said second length portion adjoining said first length portion and terminating at said stepped portion; said second length portion having a second slope greater than said first slope and greater than the slope of said end coil in the unloaded state of the helical spring; said end coil freely resting on said first and second length portions of said seating face from said spring end to said stepped portion in said unloaded state.

* * * * *